United States Patent [19]

Beccaris

[11] 4,236,620
[45] Dec. 2, 1980

[54] DOUBLE CLUTCH ASSEMBLY

[75] Inventor: Carlo Beccaris, Santena, Italy

[73] Assignee: Societe Anonyme Francaise du Ferodo, Paris, France

[21] Appl. No.: 923,293

[22] Filed: Jul. 10, 1978

[30] Foreign Application Priority Data

Jul. 13, 1977 [FR] France ................ 77 21605

[51] Int. Cl.³ .................................... F16D 21/02
[52] U.S. Cl. .................. 192/48.8; 192/70.27; 192/89 B
[58] Field of Search ............ 192/48.8, 48.7, 89 B, 192/70.27

[56] References Cited

U.S. PATENT DOCUMENTS

| | | | |
|---|---|---|---|
| 2,380,677 | 7/1945 | Schjolin | 192/89 B |
| 3,017,003 | 1/1962 | Reed | 192/70.27 |
| 3,022,931 | 2/1962 | Holz | 192/48.7 |
| 3,215,233 | 11/1965 | Smith et al. | 192/48.8 |
| 3,640,361 | 2/1972 | Spichala | 192/89 B |
| 3,749,213 | 7/1973 | Maucher | 192/48.8 |
| 3,832,934 | 9/1974 | Dach et al. | 192/89 B |

*Primary Examiner*—Francis K. Zugel
*Attorney, Agent, or Firm*—Charles E. Brown

[57] ABSTRACT

The invention relates to a double-output clutch comprising two clutch assemblies between the two pressure plates of which are interposed two spring washers separated from one another by a spacer which is axially fastened on one of the reaction plates.

The spacer forms an independent part which for the purpose of its axial fastening to the associated reaction plate bears through at least one of the spring washers against retaining means disposed axially beyond the said spring washer in relation to the spacer.

13 Claims, 11 Drawing Figures

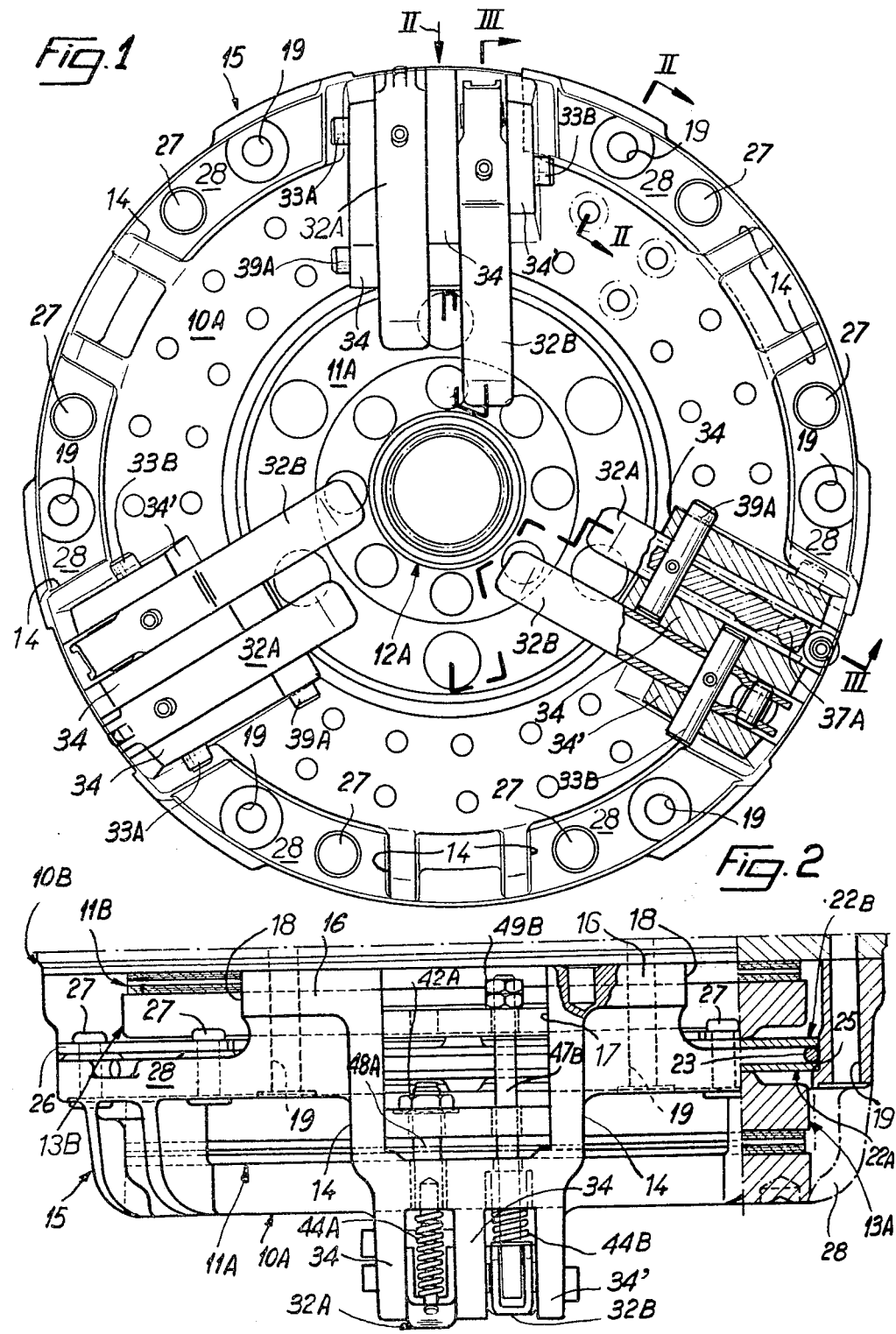

DOUBLE CLUTCH ASSEMBLY

BACKGROUND OF THE INVENTION

The present invention relates generally to clutches having two friction discs, whether these are clutches having two outputs, which are commonly called double clutches and in which each friction disc is rotationally fixed on a separate driven shaft, or whether they are single-output clutches which are commonly known as twin-disc clutches in which the two friction discs are rotationally fixed on the same driven shaft.

As is well known, a clutch of this kind, which is used particularly in vehicles and more particularly in agricultural tractors, is composed generally of two clutch assemblies, each comprising a first plate known as the reaction plate and intended to be rotationally fastened to a first shaft, usually a driving shaft, a friction disc mounted for axial movement relative to the said reaction plate and intended to be rotationally fixed to another shaft, usually a driven shaft, a second plate known as the pressure plate and mounted for axial movement relative to the reaction plate and rotationally fastened thereto, and elastic means such as a spring or springs urging the pressure plate in the direction of a position of engagement in which the friction disc is clamped between the pressure plate and the reaction plate.

In order to reduce the axial dimensions of these elastic means, it has already been proposed to place them between the two pressure plates so that they form common elastic means disposed axially between the pressure plate of the first clutch assembly and the pressure plate of the second clutch assembly, and to make them in the form of a spring washer of the Belleville type.

However, a Belleville washer by itself is suitable only for relatively moderate loads.

Furthermore, taking into account the "saddleback" characteristic load curve of a Belleville washer, in the case of a double clutch the disengagement of one of the two friction discs inevitably leads to a reduction of the load applied to the other disc.

This may lead to the slipping of the other disc, and result in poor transmission of the torque applied to it and undue heating of the clutch assembly.

Conversely, if steps are taken to avoid this slipping by using a Belleville washer having adequate characteristics to ensure that a suitable load will always be applied in these circumstances to the other friction disc, the Belleville washer will then apply an excessive load to the friction discs when disengagement is not effected.

Furthermore, since the Belleville washer is common to both clutches, it must be capable of coping with a travel which double that of a single clutch. This leads to increased "saddlebacking" of the load characteristic of the Belleville washer. Consequently, in proportion as the friction discs wear, the point of this load characteristic which corresponds to conjoint engagement of the two clutches is displaced in the direction of high loads, with the risk that either of the clutches will be able to transmit without slip, a high torque capable of damaging the components served by the clutch.

At the same time, on declutching, i.e. when one of the clutches is disengaged, the load of the Belleville washer may attain a value which is so low that the Belleville washer will no longer be able to overcome the internal frictions which are inevitably present in a clutch of this kind, and consequently the clutch will only be able to return to the engaged position under bad conditions, despite the decrease of the force which effected its disengagement.

In order to overcome these disadvantages, and in addition to obtain generally reduced saddleback load characteristics, it has been proposed for two Belleville washers to be grouped together. In certain constructions of this type, the two Belleville washers are, as before, disposed conjointly between the two pressure plates.

As previously, this has the result that the disengagement of one of the friction discs will inevitably lead to a reduction of the load on the other disc, with the consequent risk of slipping.

In order to eliminate this disadvantage, either the total load of the two Belleville washers and therefore the maximum torque which can be transmitted without slip by the clutches in question must be limited, or the diameter and consequently the space required by these clutches must be increased.

It has however already been proposed to use two independent Belleville washers, which are separated from one another by an annular spacer fastened axially on the reaction plate of one of the clutch assemblies, while on the two axially opposite faces of the said spacer there are formed respectively in each case two support shoulders against which the outer peripheries of the Belleville washers bear.

However, the arrangement adopted in this construction, and as described in particular in French Pat. No. 1,120,930, implies in practice that in order to permit the various component parts of the clutch to be placed in position axially on the same side, the skirt which one of the reaction plates usually carries, in a generally axial arrangement, to constitute a cover in relation to the other of the said parts must necessarily be axially divided, which obviously complicates the construction and assembly of the whole arrangement.

In this arrangement, the annular spacer axially separating the two Belleville washers from one another belongs to the skirt, so that it is actually fastened axially on the said skirt, but since the support shoulders which the spacer carries for the Belleville washers are necessarily inside the space formed by the latter the spacer must obligatorily constitute a separate part from the skirt in order to permit the axial engagement of that one of the Belleville washers which is axially nearer the reaction plate to which the skirt belongs.

The present invention relates generally to an arrangement enabling this disadvantage to be overcome, and permit the unitary construction of the reaction plate skirt forming a cover, while enabling the axial mounting on one and the same side of the various parts in question.

SUMMARY

The present invention relates to a clutch, particularly for automobile vehicles, of the kind consisting of two clutch assemblies, each of which comprises a first plate known as the reaction plate and intended to be rotationally fastened to a first shaft, usually a driving shaft, a friction disc mounted for axial movement relative to the said reaction plate and intended to be rotationally fastened to another shaft, usually a driven shaft, a second plate, known as the pressure plate, mounted for axial movement relative to the reaction plate and rotationally fastened to the latter, and an elastic washer of the Belleville washer type bearing by one of its peripheries against a support surface axially fastened to the reaction plate and by its other periphery urging the pressure plate in the direction of a position of engagement in which the friction disc is gripped axially between the pressure plate and the reaction plate, the elastic washers of the said clutch assemblies being axially opposite one another and axially separated from one another by an annular spacer which is axially fastened on the reaction plate of one of the said clutch assemblies, for at least one axial direction, and on which the two support surfaces associated with the said elastic washers are formed in axially opposite positions, and is characterised in that the annular spacer forms an independent part which for the purpose of its axial fastening in the aforesaid direction on one of the reaction plates, hereinafter referred to as the first reaction plate, bears through the medium of at least one of the elastic washers against annular retaining means disposed axially beyond the said elastic washer in relation to the said first annular spacer, the said annular retaining means being fastened to the said first reaction plate.

According to a second aspect, the invention provides a clutch mechanism suitable for use in a clutch of this kind, this mechanism comprising all the parts of the said clutch with the exception of the reaction plate opposite the said first reaction plate, this reaction plate, known as the second reaction plate, usually constituting a flywheel which is fastened on the output shaft of the engine which is to be equipped with the clutch and on which a clutch mechanism of this kind has to be attached, and with the further exception of the friction disc associated with the aforesaid second reaction plate.

In a preferred embodiment the spacer is a ring disposed freely between the two elastic washers; however this may be, the skirt which usually comprises the first reaction plate may advantageously be in a single piece, and conjointly the various parts in question can advantageously be placed in position on one and the same side, the spacer being itself placed in position in the course of the corresponding axial stacking.

BRIEF DESCRIPTION OF THE DRAWINGS

FIG. 1 is a plan view in the direction of the arrow I of FIG. 3 showing, partly broken away, a clutch according to the invention;

FIG. 2 is in part an external edge view in the direction of the arrow II in FIG. 1, broken away locally, and in part a view in axial section on the line II—II in FIG. 1;

DESCRIPTION OF THE PREFERRED EMBODIMENTS

The drawings illustrate the application of the invention to a clutch having two independently driven outputs, that is to say a double clutch suitable for permitting the independent operation of two different driven shafts from one and the same driving shaft.

Figure 3:
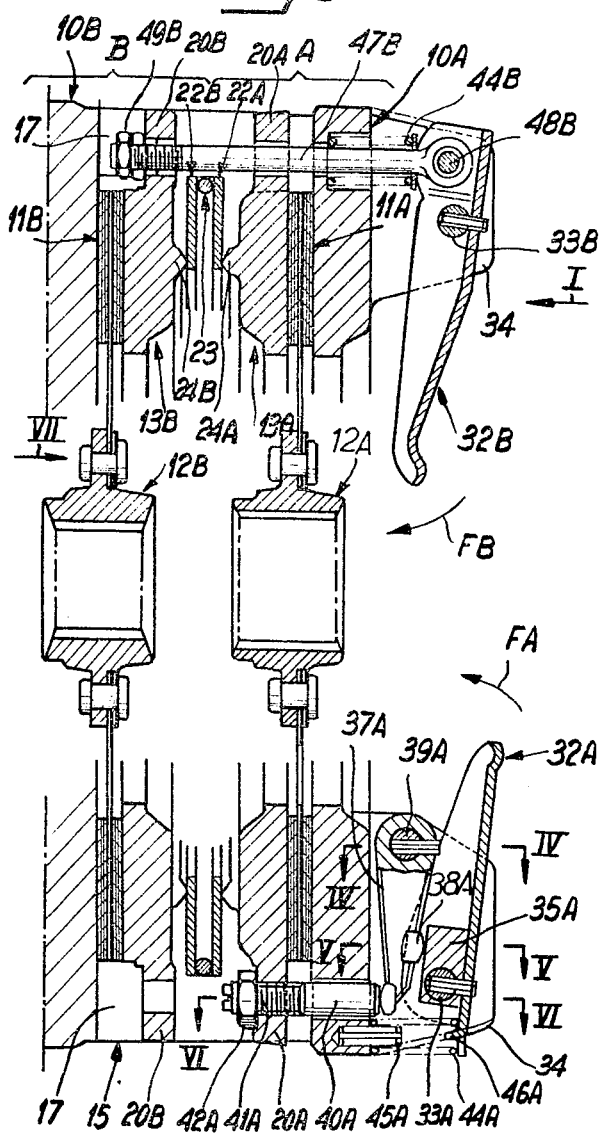
FIG. 3 is a partial view in axial section of the clutch according to the invention, taken along the broken line III—III in FIG. 1.
Figure 4:
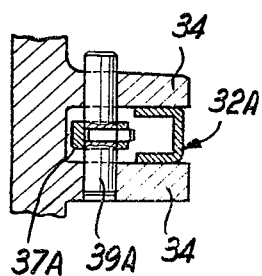
FIGS. 4, 5, and 6 are partial views in cross-section of the clutch, taken respectively along the lines IV—IV, V—V, and VI—VI in FIG. 3.
Figure 5:
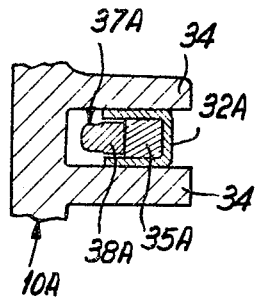
Figure 6:
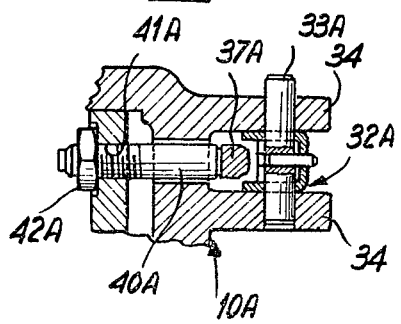

A clutch of this kind comprises two clutch assemblies A, B disposed axially one behind the other (FIG. 3).

Each of these clutch assemblies comprises in succession, from right to left in FIG. 3 in the case of assembly A, and from left to right in the same FIG. 3 for the assembly B, a reaction plate 10A, 10B, a friction disc 11A, 11B fastened to a hub 12A, 12B and movable axially in relation to the reaction plate 10A, 10B, and a pressure plate 13A, 13B rotationally fastened to the reaction plate 10A, 10B and axially movable relative to the latter in order to grip the corresponding friction disc 11A, 11B.

Figure 7:
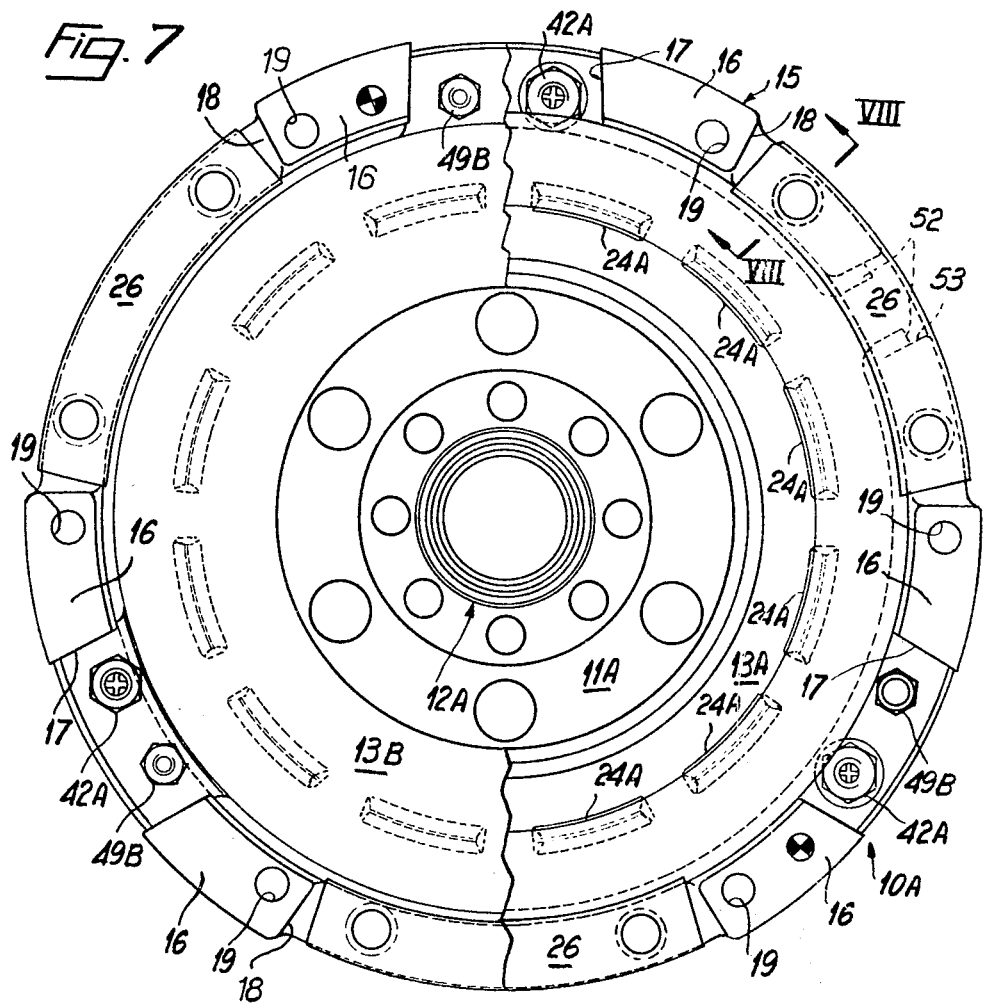
FIG. 7 is another view in elevation, viewed generally in the direction of the arrow VII in FIG. 3, a reaction plate and a friction disc being omitted in the left-hand half of this Figure, while in the right-hand half of the Figure a pressure plate is additionally omitted.

The reaction plate 10A, hereinafter referred to as the first reaction plate, has on its periphery a substantially cylindrical skirt 15 which extends generally axially around the friction discs 11A, 11B and the pressure plates 13A, 13B, and whose free edge is provided in the example illustrated, for reasons which will be explained hereinafter, with cutouts 17 and 18 forming posts 16 circularly between them (FIG. 7); by the end face of these posts 16 the reaction plate 10A is axially in contact with the reaction plate 10B, while screws, which are not shown in the drawings and which for this purpose pass through passages 19 provided axially in the said posts 16, enable the reaction plate 10A to be attached to the reaction plate 10B.

In practice, in the example illustrated the posts 16 are axially of small height, while at their root the skirt 15 is provided with cavities 14 (FIG. 2) of such a nature as to assist the ventilation of the inside space of the reaction plate 10A.

Because it is integral with a skirt 15, even though the skirt is provided with cutouts and cavities, the reaction plate 10A forms generally a cover for the friction discs 11A, 11B and the pressure plates 13A, 13B.

The reaction plate 10B, which is shown only partly in the drawings, forms a flywheel in the usual manner and, in accordance with arrangements not visible in these drawings and which are known per se, it can be rotationally fastened to a first shaft, in this case a driving shaft or input shaft, while the hubs 12A, 12B of the friction discs 11A, 11B are each adapted to be rotationally fastened to another shaft, which in this case is a driven shaft, the said hubs 12A, 12B being for this purpose provided on their inside periphery with splines for engagement on the corresponding driven shaft.

In the case of a two-output clutch, each of the friction discs 11A, 11B is thus rotationally fastened on a separate driven shaft; in the case of a single-output clutch, however, these two friction discs would both be fastened on one and the same driven shaft.

Lugs 20A, 20B on the pressure plates 13A, 13B extend radially through the cutouts 17 in the skirt 15 of the pressure plate 10A (FIG. 3), and are engaged for axial sliding in the said cutouts 17, thus effecting the rotational fastening of the pressure plates 13A, 13B to the assembly formed by the reaction plates 10A, 10B, while permitting axial displacement of the said pressure plates relative to the said reaction plates.

Between the pressure plates 13A, 13B which are framed by the reaction plates 10A, 10B and which are disposed facing one another, are provided elastic means suitable for urging the said pressure plates 13A, 13B in the direction of a position of engagement in which the friction discs 11A, 11B are gripped between the pressure plates 13A, 13B and the reaction plates 10A, 10B, as shown in FIG. 3.

These elastic means are two spring washers 22A, 22B of the Belleville washer type.

These spring washers 22A, 22B are axially directed in opposite directions and are axially separated from one another by a common annular spacer 23, which is axially fastened on the reaction plate 10A and on which two support surfaces for the spring washers 22A, 22B are formed in axially opposite positions.

In the example illustrated each spring washer 22A, 22B bears by its outer periphery against the spacer 23, against the corresponding support shoulder of the latter, while by its inner periphery it acts on the corresponding pressure plate 13A, 13B, this pressure plate having a projecting annular bead 24A, 24B which is intended for making contact with the said spring washer and which in practice is circularly divided into bead sectors.

According to the invention the annular spacer 23 forms an independent part, in practice a simple ring, of annular cross-section which is freely disposed between the two spring washers 22A, 22B; for its axial location on a reaction plate, which is hereinafter referred to as the first reaction plate and which in practice is the reaction plate 10A, it bears through the medium of at least one of these spring washers against annular retaining means disposed axially beyond the spring washer in relation to the annular spacer, the annular retaining means being fastened to the first reaction plate 10A.

In the example shown in FIGS. 1 to 8 these annular retaining means are provided beyond each of the spring washers 22A, 22B.

Figures 8, 9, 10, 11:
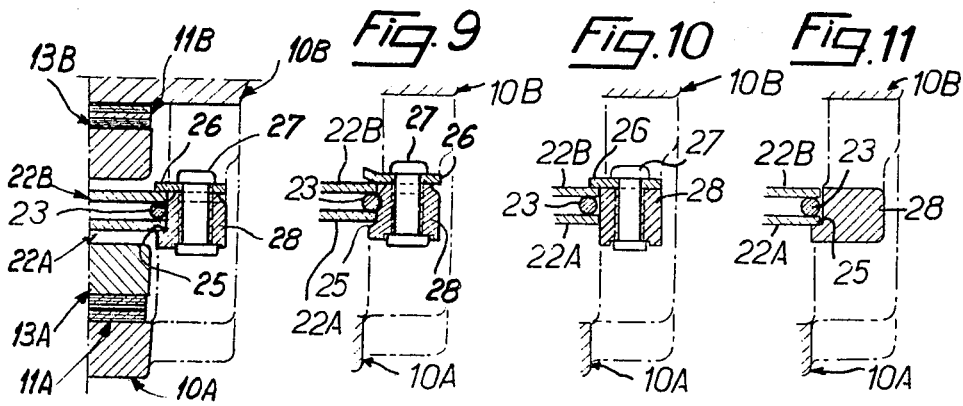
FIG. 8 is a partial view in axial section of a clutch according to the invention, taken along the line VIII—VIII in FIG. 7.
FIGS. 9, 10, and 11 repeat a detail from FIG. 8, relating respectively to different embodiments.

Beyond the spring washer 22A, and therefore between the spring washers 22A, 22B and the reaction plate 10A, there is a simple retaining shoulder 25 (FIGS. 2 and 8).

In the example illustrated this shoulder 25 is integral with the reaction plate 10A, being formed on the skirt 15 of the latter, and more particularly on the inner surface of this skirt.

In the example illustrated in FIGS. 1 to 8 this shoulder is a generally transverse shoulder, that is to say substantially perpendicular to the axis of the assembly.

Beyond the spring washer 22B, and therefore beyond the spring washers 22A, 22B in relation to the reaction plate 10A, the annular retaining means used for the annular spacer 23 are circularly divided into segments 26, and each of these is attached to the reaction plate 10A with the aid of one of the cutouts 18 provided in the skirt 15; in the example illustrated there are thus three segments 26.

Each segment 26 is fastened by rivets 27 to a bar 28 forming the bottom of the corresponding cutout 18 (FIGS. 2 and 8).

The segments 26 project radially inside the skirt 15 so that the spring washers 22A, 22B and the spacer 23 which they frame are enclosed between these segments 26 and the shoulder 25 of the reaction plate 10A, and so that the axial fastening of the spacer 23 on the reaction plate 10A is effected on the one hand by the segments 26 through the spring washer 22B on the side where this washer 22B is situated, and on the other hand by the shoulder 25 through the spring washer 22A on the side where the washer 22A is situated.

In the example illustrated the spring washer 22B is directly in contact with the segments 26; as an alternative, a ring could be interposed between this spring washer and these segments.

Similarly, in the example shown the spring washer 22A is directly in contact with the shoulder 25 of the reaction plate 10A, but as an alternative a ring could be interposed between the said spring washer and the said shoulder.

With the clutch assembly A is associated a set of clutch release levers 32A, of which there are three in the embodiment illustrated.

Each clutch release lever 32A is fastened on a pivot 33A carried by two bosses 34 which for that purpose are provided on the outer face of the reaction plate 10A.

The clutch release levers 32A extend substantially radially from the periphery of the reaction plate 10A to the axis of the assembly, and for their operation they are usually associated at their free end with a clutch release bearing mounted for axial movement around the axis (not shown in the drawings).

The clutch release levers 32A are channel-shaped, being made of folded sheet metal, and a plate 35A is disposed between their arms which is engaged on the corresponding pivot 33A.

By means of a plate 35A of this kind each clutch release lever 32A is in contact with an intermediate lever 37A which, for this purpose, carries a boss 38A and which is in turn fastened on a pivot 39A carried by the same bosses 34 of the reaction plate 10A which carries the pivot 33A of the corresponding clutch release lever 32A (FIG. 3).

The pivot 39A of an intermediate lever 37A is nearer the axis of the assembly than the pivot 33A of the corresponding clutch release lever 32A, and by its free end, beyond the boss 38A provided on it, an intermediate lever 37A is in contact with a push-rod 40A which passes axially with clearance through the reaction plate 10A and is engaged by a screw connection in a tapped hole 41A in the pressure plate 13A for the purpose of cooperation, beyond the latter, with a lock-nut 42A.

In addition, between the reaction plate 10A and each clutch release lever 32A there is interposed, at the free end of the latter which is nearer the periphery of the said reaction plate, a spring 44A engaged on studs 45A and 46A carried respectively by the reaction plate 10A and the clutch release lever 32A in question.

Similarly, with the clutch assembly B there are associated clutch release levers 32B, of which there are likewise three in the example illustrated, and which are each respectively associated with a clutch release lever 32A; each clutch release lever 32B is fastened on a pivot 33B carried by one of the bosses 34 carrying the pivot 33A of the corresponding clutch release lever 32A and a third boss 34' provided on the outer surface of the reaction plate 10A, parallel to the previously mentioned bosses 34 (FIG. 1).

The clutch release levers 32B extend substantially radially from the periphery of the reaction plate 10A towards the axis of the assembly, each parallel to the corresponding clutch release lever 32A, and for their operation there is usually associated with them, at their free end, a clutch release bearing (not shown in the drawings) mounted for movement along the said axis.

At their free end nearer the periphery of the reaction plate 10A the clutch release levers 32B are each individually fastened to the pressure plate 20B by ties 47B which are articulated at 48B on the clutch release levers 32B which pass axially with clearance through the reaction plate 10A, the pressure plate 20A, and the pressure plate 20B, and which beyond the latter carry a stop 49B, in practice a nut with which a lock-nut is associated, by which they are in contact with the pressure plate 20B.

Around each tie 47B a spring 44B is interposed between the reaction plate 10A and the corresponding clutch release lever 32B.

The various parts making up the clutch according to the invention are assembled in the following manner: the friction disc 11A is engaged axially in the reaction plate 10A forming a cover, until it makes contact with the latter, and in the same direction the pressure plate 13A, the spring washer 22A, the spacer 23, and the spring washer 22B are successively stacked within this reaction plate.

The segments 26 are then in turn engaged, in the same axial direction, in the cutouts 18 in the skirt 15 until they make contact with the inner periphery of the spring washer 22B, and with the aid of a press which also effects the riveting of these segments, a pressure is applied to the inner periphery of the spring washer 22B so that the spring washer 22A is placed under load through the said spring washer 22B and the spacer 23, whereby the segments 26 are applied against the corresponding bars 28, whereupon these segments 26 are riveted to the latter.

All that is then required is to place in position the pressure plate 13B by connecting it with the aid of the ties 47B to the clutch release levers 32B, whereupon the friction disc 11B is placed in position, and finally the assembly produced in this manner is attached by screws to the reaction plate 10B forming the flywheel.

When through the action of the clutch release bearing associated with them the clutch release levers 32A are rocked in the direction of the arrow FA in FIG. 3, these clutch release levers 32A in turn bring about the pivoting of the associated intermediate levers 37A in the opposite direction to that in which they were rocked, and through the push-rods 40A on which they act, these intermediate levers 37A bring about in turn an axial withdrawal movement of the pressure plate 13A which by moving away from the reaction plate 10A against the action of the spring washer 22A, frees the friction disc 11A.

This friction disc 11A is thus released and the corresponding output shaft is no longer rotationally fastened to the input shaft to which the reaction plate 10A is fastened through the reaction plate 10B.

When the clutch release bearing in question ceases to act on the clutch release levers 32A, the spring washer 22A once again effects the gripping of the friction disc 11A and also, conjointly with the springs 44A, the return of the clutch release levers 32A to their original position.

Similarly, when under the action of the clutch release bearing associated with them, the clutch release levers 32B are rocked in the direction of the arrow FB in FIG. 3, these clutch release levers 32B apply through the ties 47B a traction to the pressure plate 13B, which then moves away from the reaction plate 10B against the action of the spring washer 22B.

The friction disc 11B is thus released and the corresponding output shaft is no longer rotationally connected to the input shaft to which the reaction plate 10B is fastened.

When the associated clutch release bearing ceases to act on the clutch release levers 32B, the spring washer 22B once again gives rise to the gripping of the friction disc 11B and also, conjointly with the springs 44B, the return of the clutch release levers 32B to the original position.

The clutch release bearings associated with the clutch release levers 32A, 32B can act simultaneously on the latter.

In all cases the spring washers 22A, 22B work independently of one another because they bear against a spacer 23 which is axially fastened to the reaction plate 10A.

In order to facilitate the rocking movement undergone by these spring washers 22A, 22B during operation, provision is made to leave a certain clearance in the stack formed by these spring washers and the spacer 23 separating them, between the shoulder 25 of the reaction plate 10A and the segments 26 supporting this stack in relation to the said reaction plate.

In addition, in the modified embodiment illustrated in FIG. 9 provision is made for the same purpose to give a frusto-conical shape to the shoulder 25 of the reaction plate 10A; a similar arrangement may be adopted for the corresponding shoulder of the segments 26, and, as illustrated, this arrangement can very simply result from the inevitable deformation undergone by the corresponding edge of these segments when they are cut out.

In another modified embodiment, which is not illustrated, the ring constituting the annular spacer 23 is given a "tile" shape, that is to say it has one or more undulations with their axes perpendicular to that of the stack to which they belong, thus elastically absorbing the play which, as previously stated, is provided in this stack.

As mentioned above, in the embodiment illustrated in FIGS. 1 to 9, the spacer 23 is a simple ring; as illustrated, this ring may be opened by a slot and its circumferential edges given returns directed radially outwards, extending parallel to one another, and engaged radially in a passage 53 provided for the purpose in the skirt 15 of the reaction plate 10A, in order to support the said spacer circumferentially (FIG. 7).

However, as an alternative, since this support can be achieved for example by simple friction or with the aid of flats provided for the purpose on the spacer cooperating with corresponding flats provided on the skirt 15, the circumferential ends of this spacer may have no radial or axial returns and may or may not be fastened to one another, for example by welding.

In the foregoing the axial fastening of the annular spacer 23 is effected beyond each of the spring washers 22A, 22B, that is to say in both directions.

This arrangement is particularly suitable when the two clutch assemblies A, B must be capable of the same performance and consequently the two spring washers 22A, 22B have the same power, that is to say are capable of giving the same load.

When this is not the case, that is to say when it is acceptable for one of the clutch assemblies A or B to have a lower performance than the other, as is the case for example for a power take-off, and the corresponding spring washer therefore has a lower power than that of the other, it is sufficient for the spacer 23 to be axially fastened on one side only, that is to say in only one direction, by means of the less powerful spring washer 22A, 22B, provided that, whatever the travel, the load of the more powerful spring washer is still greater than that of the less powerful washer.

In such a case, the more powerful spring washer, which has no support on the opposite side to the annular spacer, permanently applies the annular spacer 23 against the other washer and, through the latter, against the retaining means provided for the purpose beyond the spring washer.

This possibility is illustrated in FIGS. 10 and 11.

In FIG. 10 the spring washer 22A is the more powerful; only the retaining segments 26 beyond the elastic washer 22B are provided, and the shoulder 25 of the reaction plate 10A is omitted.

As an alternative, in FIG. 11 the spring washer 22B is the more powerful; only the shoulder 25 of the reaction plate 10A beyond the spring washer 22A is provided, and the retaining segments 26 are eliminated.

In all cases the spring washers 22A, 22B are axially opposite one another and act, i.e. develop their load, independently of one another.

The present invention is not limited to the various embodiments described and illustrated, but includes any modified embodiments and/or combination of their various elements within the scope of the appended claims.

Furthermore, the field of application of the invention is not limited to the case of a double-output clutch, but also extends to the case of a clutch in which the two friction discs are mounted on the same output shaft.

Finally, as will have been noted, the component parts of the clutch assembly A and of the clutch assembly B—with the exception, in the case of the latter, of the reaction plate 10A and of the associated friction disc 11A—conjointly form a unit which is commonly known as a "clutch mechanism" suitable for attachment as such to the reaction plate 10B which forms a flywheel, as mentioned above, after insertion of a friction disc, and also suitable for constituting the desired clutch in conjunction with the said flywheel and the said friction disc.

I claim:

1. A clutch of the kind comprising two clutch assemblies; each of said clutch assemblies including a reaction plate adapted to be fixed for rotation with a shaft, a friction disc mounted for axial movement relative to said reaction plate and adapted to be fixed for rotation with another shaft, a pressure plate mounted for axial movement relative to said reaction plate and fixed for rotation therewith, a Belleville type spring washer bearing along one of its peripheries against a support surface and the other of its peripheries urging said pressure plate toward an engagement position in which said friction disc is gripped axially between said pressure plate and said reaction plate; said spring washers of said clutch assemblies axially acting in opposite directions, an annular spacer axially separating said spring washers from each other, means for axially fixing said annular spacer relative to said reaction plate of one of said clutch assemblies in at least one axial direction, said support surfaces for said spring washers being formed on said annular spacer in axially spaced relation to each other; the improvement comprising said annular spacer defining a part separate and distinct from said means for axially fastening said annular spacer relative to said reaction plate of one of said clutch assemblies, said last mentioned means comprising an annular retaining means, said annular spacer bearing through one of said spring washers against said annular retaining means, said annular retaining means being disposed axially beyond said one spring washer in relation to said annular spacer.

2. A clutch according to claim 1, wherein said annular retaining means is formed of a plurality of separate segments.

3. A clutch according to claim 2, in which a first of said reaction plates is integral with a generally cylindrical skirt which extends axially in one piece around an associated one of said pressure plates and said spring washers and whose free edge is provided circularly at intervals with cutouts, and wherein the said segments are attached to said first reaction plate through of said cutouts.

4. A clutch according to claim 3, wherein that spring washer disposed on the side facing said segments is provided in direct contact therewith.

5. A clutch according to claim 3, wherein said segments are axially disposed beyond the spring washers in relation to said first reaction plate.

6. A clutch according to claim 3, wherein said annular retaining means comprise a shoulder provided on said first reaction plate.

7. A clutch according to claim 6, wherein said shoulder is disposed axially between the spring washers and said first reaction plate.

8. A clutch according to claim 6 or claim 7, wherein the spring washer disposed on the side facing said shoulder is in direct contact therewith.

9. A clutch according to claim 6 or claim 7, wherein said shoulder is generally frusto-conical.

10. A clutch according to claim 1, wherein for axial fastening of the annular spacer in both directions, other annular retaining means are provided beyond the other of said spring washers, said two retaining means together fastening said annular spacer in opposite axial directions.

11. A clutch according to claim 1, with said spring washers and said annular spacer separating them forming a stack, with axial play being provided in the stack.

12. A clutch according to claim 11, wherein said annular spacer comprises a toroidal ring with at least one undulation having its axis perpendicular to that of the stack.

13. A clutch cover assembly for a double clutch assembly, comprising first and second clutch assemblies, said first clutch assembly including a reaction plate adapted to be fixed for rotation with a shaft, a friction disc mounted for axial movement relative to said reaction plate and adapted to be fixed for rotation with another shaft, a pressure plate mounted for axial movement relative to said reaction plate and fixed for rotation therewith, a Belleville type spring washer bearing along one of its peripheries against a support surface on one side of an annular spacer, the other of said spring washer peripheries urging said pressure plate toward an engagement position in which said friction disc is gripped axially between said pressure plate and said reaction plate, said second clutch assembly including a Belleville type spring washer bearing against a support surface on the other side of said annular spacer at one of its peripheries and adpated to urge a second pressure plate of said second clutch assembly for gripping a second friction disc between said second pressure plate and a second reaction plate, said spring washers acting in opposite directions with said annular spacer axially separating them, means for axially fixing said annular spacer relative to said reaction plate of one of said clutch assemblies in at least one axial direction, said support surfaces for said spring washers being formed on said annular spacer in axially spaced relation from each other; the improvement comprising said annular spacer defining a part separate and distinct from said means for axially fastening said annular spacer relative to said reaction plate of one of said clutch assemblies, said last mentioned means comprising an annular retaining means, said annular spacer bearing through one of said spring washers against said annular retaining means, said annular retaining means being disposed axially beyond said one spring washer in relation to said annular spacer.

* * * * *